(12) United States Patent
Yamaguchi et al.

(10) Patent No.: US 6,672,747 B2
(45) Date of Patent: Jan. 6, 2004

(54) VEHICLE HEADLAMP HAVING REMOVABLE LIGHTING CONTROL UNIT

(75) Inventors: Hiranao Yamaguchi, Gamagori (JP); Koichi Toyama, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/211,244

(22) Filed: Aug. 5, 2002

(65) Prior Publication Data

US 2003/0031022 A1 Feb. 13, 2003

(30) Foreign Application Priority Data

Aug. 7, 2001 (JP) ........................................ 2001-239825

(51) Int. Cl.$^7$ ................................................. B60Q 1/04
(52) U.S. Cl. ........................ 362/549; 362/507; 362/548; 362/265
(58) Field of Search ................................ 362/507, 538, 362/544, 549, 263, 265, 548, 374, 375

(56) References Cited

U.S. PATENT DOCUMENTS

| 5,119,275 A | 6/1992 | Makita ....................... 362/548 |
| 5,188,444 A | * 2/1993 | Makita et al. ............... 362/519 |
| 5,597,232 A | * 1/1997 | Ohashi et al. ............... 362/265 |
| 5,607,228 A | * 3/1997 | Ozaki et al. ................. 362/263 |
| 6,000,816 A | * 12/1999 | Serizawa et al. ........... 362/297 |
| 6,123,439 A | * 9/2000 | Hiranaka et al. ........... 362/459 |

FOREIGN PATENT DOCUMENTS

| DE | 197 53 605 A | 6/1999 |
| DE | 198 15 984 A | 10/1999 |
| EP | WO 93 11387 A | 6/1993 |
| EP | 1179704 A1 | 2/2002 |
| JP | A-10-228804 | 8/1998 |

* cited by examiner

Primary Examiner—Stephen Husar
Assistant Examiner—Hargobind S. Sawhney
(74) Attorney, Agent, or Firm—Posz & Bethards, PLC

(57) ABSTRACT

In a headlamp for a vehicle, a lighting control circuit unit is provided in a lamp housing. The lighting control circuit unit is fixed to a holder with screws and the holder is fixed to a rear surface of a reflector with screws. A discharge lamp bulb is held on the reflector. The discharge lamp bulb is directly connected to the lighting control circuit unit. The lighting control circuit unit is removable through an opening of the lamp housing in a state that the discharge lamp bulb is held on the reflector. Also, the discharge lamp bulb is exchangeable through the opening.

11 Claims, 8 Drawing Sheets

VEHICLE HEADLAMP HAVING REMOVABLE LIGHTING CONTROL UNIT

CROSS REFERENCE TO RELATED APPLICATION

This application is based on Japanese Patent Application No. 2001-239825 filed on Aug. 7, 2001, the disclosure of which is incorporated herein by reference.

FIELD OF THE INVENTION

The present invention relates to a headlamp having a discharge lamp and it is suitable for mounting on a vehicle.

BACKGROUND OF THE INVENTION

Recently, a discharge lamp is used for a vehicular headlamp. The discharge lamp is an arc discharge-type lamp in which such as xenon gas is enclosed in a discharge lamp bulb (arc tube). The lamp is emitted with a discharging phenomenon generated between a pair of electrodes. The light is white near the sunlight. As compared with a conventional halogen lamp, the discharge lamp emits twice quantity of light with power saving of about 70%, thereby increasing visibility of the headlamp.

In general, a high voltage of substantially a few kV to a few tens of kV is applied to turn on a discharge lamp. After the discharge lamp is turned on, a voltage of substantially 35W is applied to the discharge lamp to maintain it lit up. Therefore, a special lighting control circuit unit is required to drive the discharge lamp. The lighting control circuit unit mainly includes a converter for increasing a direct current voltage from a battery, an inverter for exchanging the direct current voltage into an alternate current voltage and an igniter for generating high voltage of substantially a few tens kV.

In the vehicular headlamp, the lighting control circuit unit is generally mounted outside of a lamp housing. In this case, a high voltage supplying wire for supplying a high voltage to the discharge lamp and an electric connector are required. Therefore, it is difficult to downsize the unit. Also, a space for mounting the unit is required on the vehicle and mounting or fixing work is increased. Furthermore, a shielding member is required to reduce an electric noise generated by the high voltage supplying wire, thereby increasing a manufacturing cost.

To solve the above disadvantages, in a vehicular headlamp disclosed in JP-A-10-228804, for example, a lighting control circuit unit is fixed to a rear surface of a reflector in a lamp housing. An electric connector is embedded in the lighting control circuit unit and a discharge lamp bulb is directly connected to the connector.

In this kind of headlamp, when the discharge lamp bulb is exchanged, the lighting control circuit unit is removed first from the lamp housing. In the headlamp disclosed in JP-10-228804, the size of the lighting control circuit unit is relatively larger than that of an opening portion formed on the lamp housing for an exchange of the discharge lamp bulb. Therefore, when the lighting control circuit unit is removed from the lamp housing, the lighting control circuit unit is not only pulled in an axial direction of the discharge lamp bulb, but also turned or moved repeatedly in a direction different from substantially the axial direction of the discharge lamp bulb. Therefore, it takes time to remove the lighting control circuit unit. Further, the lighting control circuit unit, connector and discharge lamp bulb are integrated. Therefore, it is required to remove the lighting control circuit unit integrally with the connector and discharge lamp bulb to exchange the lighting control circuit unit. Accordingly, it takes time to exchange the lighting control circuit unit.

SUMMARY OF THE INVENTION

The present invention is made in view of the above disadvantages, and it is an object of the present invention to provide a headlamp in which a discharge lamp bulb is easily exchanged.

It is another object of the present invention to provide a headlamp in which a lighting control circuit unit is removable from a lamp housing separately from a discharge lamp bulb.

In a headlamp of the present invention, a lighting control circuit unit for driving the discharge lamp bulb is provided in a lamp housing. A discharge lamp bulb is held on a reflector. The discharge lamp bulb is directly connected to the lighting control circuit unit. The lighting control circuit unit is removable through an opening of the lamp housing while the discharge lamp bulb is fixed to the reflector.

According to the headlamp of the present invention, it is possible to remove the lighting control circuit unit separately. Therefore, the lighting control circuit unit and the discharge lamp bulb are separately and easily removed and exchanged.

BRIEF DESCRIPTION OF THE DRAWINGS

Other objects, features and advantages of the present invention will become more apparent from the following detailed description made with reference to the accompanying drawings, in which.

DETAILED DESCRIPTION OF PREFERRED EMBODIMENT

Preferred embodiments of the present invention will be described hereinafter with reference to the drawings.

(First Embodiment)

Figure 1:
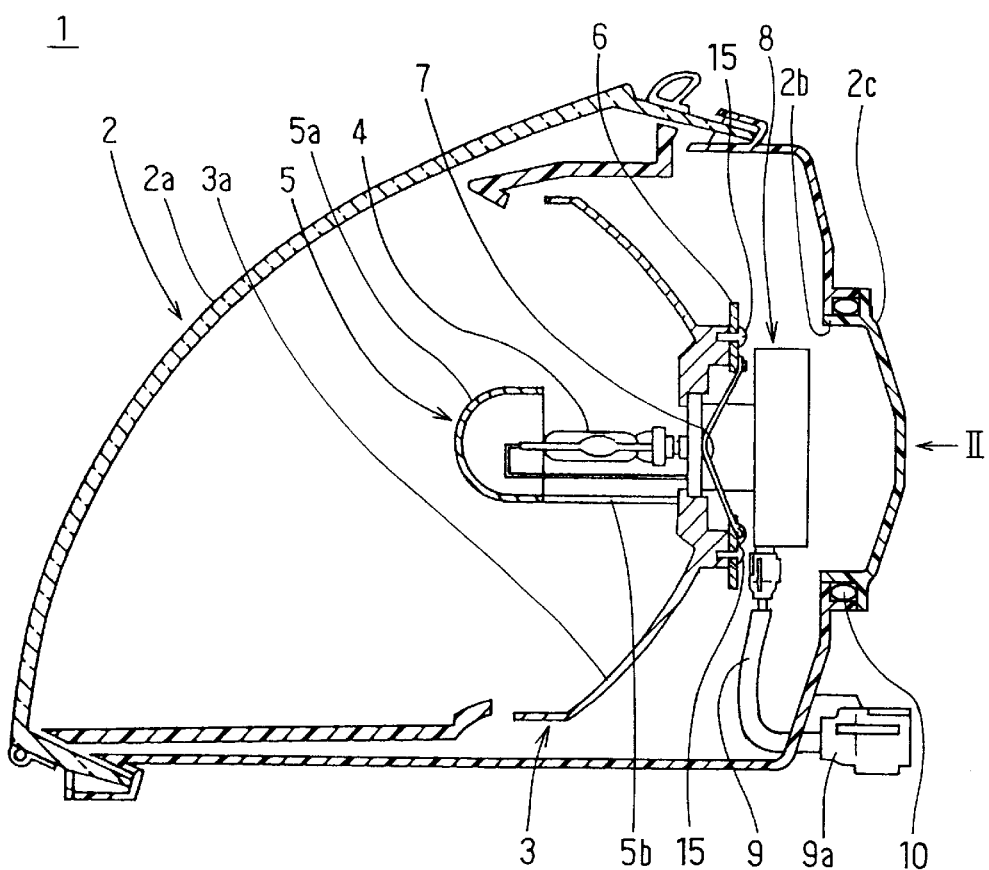
FIG. 1 is a cross-sectional view of a headlamp according to the first embodiment of the present invention.
Figure 2:
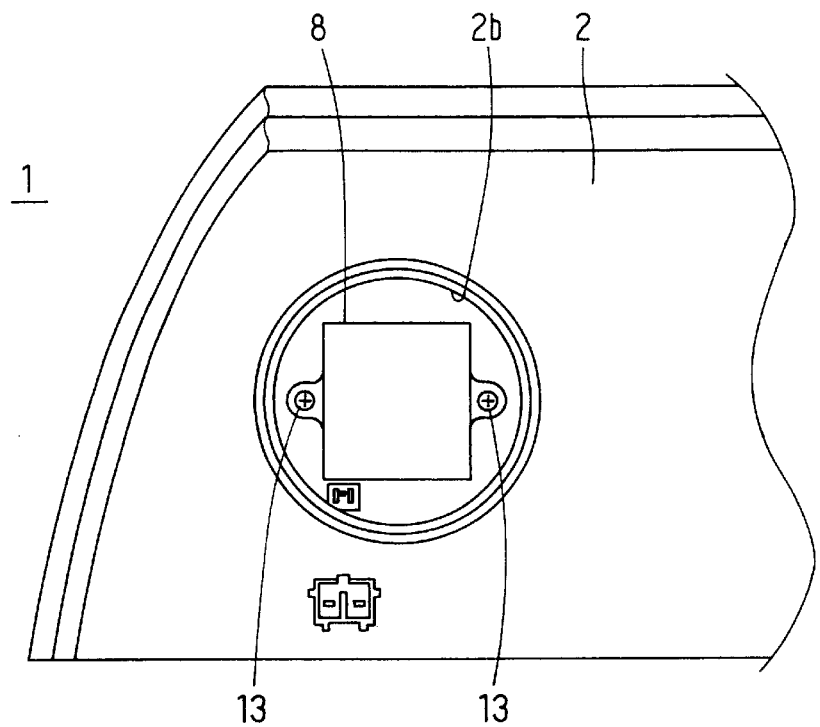
FIG. 2 is a rear view of the headlamp, which is viewed along an arrow II in FIG. 1, according to the first embodiment of the present invention.
Figure 3:
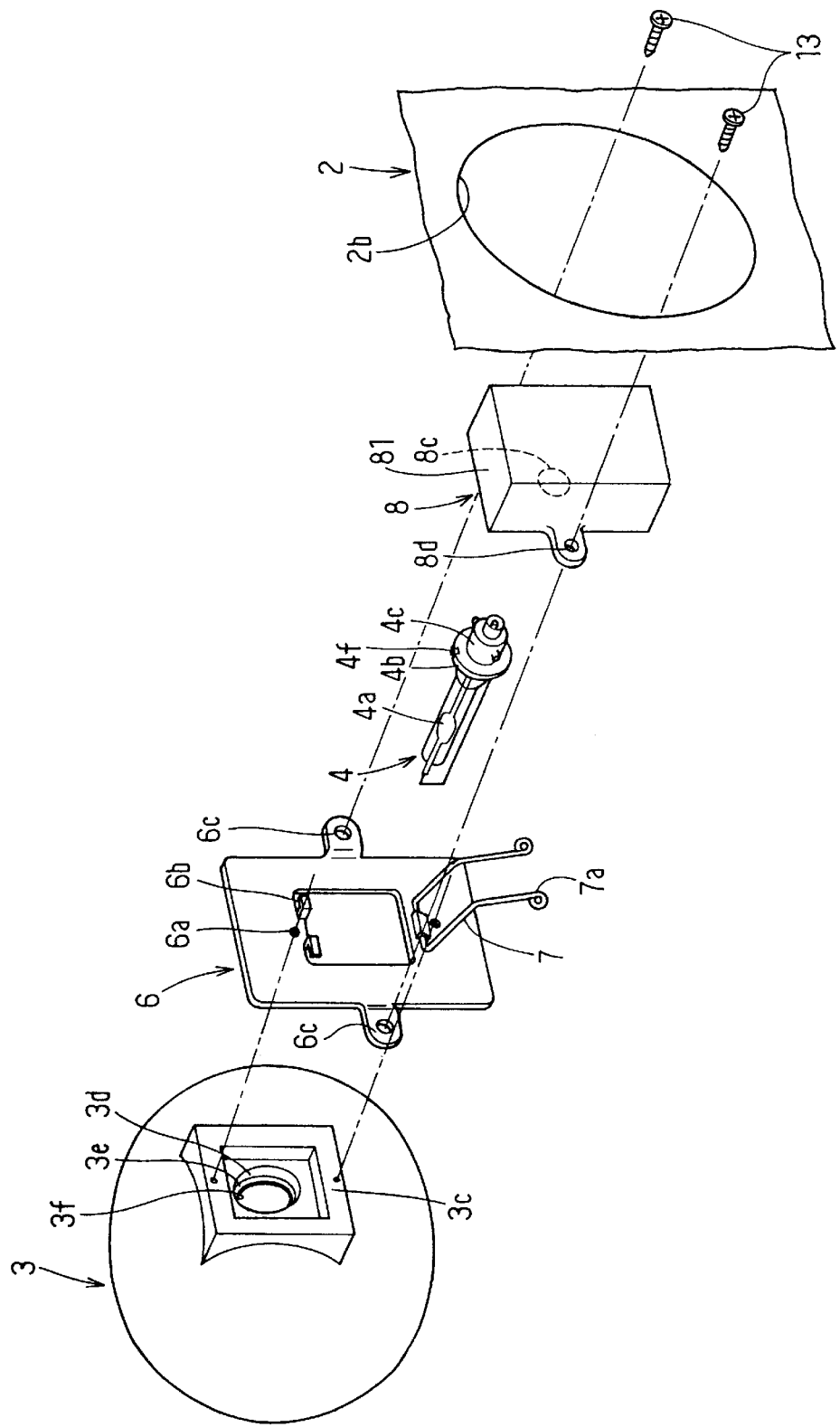
FIG. 3 is an exploded perspective view of main components of the headlamp according to the first embodiment of the present invention.

FIG. 1 is a cross-sectional view of a headlamp 1. The headlamp 1 is mounted on a vehicle in a top and bottom, and left and right direction shown in FIG. 1. FIG. 2 is a rear view of the headlamp 1 when it is viewed along an axial direction of a discharge lamp bulb 4 (a direction indicated by an arrow II in FIG. 1). FIG. 3 is an exploded perspective view of main components of the vehicular headlamp 1. For the sake of clarity, a lamp housing 2 is partially illustrated in FIG. 3 and removed from a reflector 3.

As shown in FIG. 1, the headlamp 1 has the lamp housing 2, the reflector 3, the discharge lamp bulb 4, a shade 5, a lighting control circuit unit 8 and a holder 6. The lamp housing 2 has a transparent lens 2a. The reflector 3 is fixed in the lamp housing 2. The reflector 3 has a reflecting mirror on a front surface which is on a discharge lamp bulb 4 side. The shade 5 partially shields light of the discharge lamp bulb 4 and restricts the light from being lit directly forward. The bolder 6 is a holding member for holding the lighting control circuit unit 8. The holder 6 is fixed to a rear surface of the reflector 3. The lighting control circuit unit 8 is arranged on a rear side of the reflector 3.

The lamp housing 2 is made of a resin molding. The lamp housing 2 has the transparent lens 2a on a front side. The lamp housing 2 encloses the reflector 3, the discharge lamp bulb 4 and the lighting control circuit unit 8. The lamp housing 2 has an opening portion 2b adjacent to the lighting control circuit unit 8.

Figure 4:
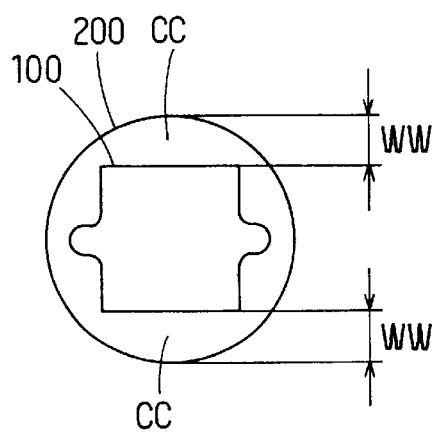
FIG. 4 is a schematic illustration showing a positional relationship between a first outline of a lighting control circuit unit and a second outline of an opening portion of a lamp housing, according to the first embodiment of the present invention.

Referring to FIG. 4, a second outline 200 is an outline of the opening portion 2b when the opening portion 2b is projected in the axial direction of the discharge lamp bulb 4 (right and left direction in FIG. 1). The opening portion 2b is formed into substantially a circular such that the lighting control circuit unit 8 can pass through the opening portion 2b. The discharge lamp bulb 4 and the lighting control circuit unit 8 can be removed or exchanged through the opening portion 2b. Also, the lighting control circuit unit 8 can be inspected through the opening portion 2b.

The discharge lamp bulb 4 has a flange 4b on an end of a light emitting portion 4a and is held by the reflector 3, as shown in FIG. 3. Also, the discharge lamp bulb 4 has a male connector 4c at an end and is electrically connected to the lighting control circuit unit 8.

The shade 5, which partially shields the light of the discharge lamp bulb 4, is made of metallic materials. The shade 5 has a shading portion 5a having substantially a hemispherical shape and a support portion 5b, as shown in FIG. 1. The support portion 5b supports the shading portion 5a at an end and is fixed to the reflector 3 at the other side end. The shading portion 5a is arranged to surround the front side of the discharge lamp bulb 4. The shading portion 5a shields light components that are emitted directly forward from the discharge lamp bulb 4. With this, because only light reflected by the reflector 3 is emitted forward, a predetermined lighting pattern for the vehicular can be obtained with the reflector 3. Also, the shading portion 5a shields an electromagnetic wave noise emitted directly forward from the discharge lamp valve 4.

The reflector 3 is formed with a reflecting mirror 3a on its front surface. The reflecting mirror 3a has a concave shape. As shown in FIG. 3, a holding portion 3d is formed in a middle of the reflector 3 to hold the discharge lamp bulb 4. The reflector 3 is entirely made of a metallic material. Alternatively, the reflector 3 is made of at least two kinds of materials, such as a combination of a metallic material and a non-metallic material such as resin. For example, the reflector 3 is made by depositing an aluminum film on a resin material.

It is required that the discharge lamp bulb 4, especially the emitting portion 4a, is arranged in a predetermined position with respect to the reflecting mirror 3a so that the headlamp 1 works properly. As shown in FIG. 3, the discharge lamp bulb 4 is properly positioned with respect to the reflecting mirror 3a in such a manner that the flange 4b of the discharge lamp bulb 4 is inserted in the holding portion 3d, the front surface (a emitting portion 4a side) of the flange 4b is press-contacted to a positioning stopper 3e and a recessed portion 4f of the flange 4b is engaged with a projection 3f of the stopper 3e. The light emitted from the discharge lamp bulb 4 is reflected forward with the reflecting mirror 3a of the reflector 3 so that the predetermined lighting pattern for the vehicle can be obtained. The reflector 3 has a fixing surface 3c on its rear surface for receiving the holder 6. The lighting control circuit unit 8 is fixed to the holder 6. That is, the lighting control circuit unit 8 is attached on the rear side of the reflector 3 through the holder 6.

The lighting control circuit unit 8 drives the discharge lamp bulb 4. The lighting control circuit unit 8 has a case 81 formed into substantially a rectangular solid. An electric circuit is installed in the case 81. The electric circuit includes a converter for increasing a direct current voltage from a battery (not shown), an inverter for changing the direct current voltage into an alternate current voltage, an igniter for generating high voltage required to turn on the discharge lamp bulb 4. The electric circuit controls electric power for driving the discharge lamp bulb 4.

The lighting control circuit unit 8 is fixed to the holder 6 fixed on the rear surface of the reflector 3. The lighting control circuit unit 8 has female connector 8c and is electrically connected to the discharge lamp bulb 4 directly through the female connector 8c and the male connector 4c. That is, additional lead wires are not required to connect the lighting control circuit unit 8 and the discharge lap bulb 4. As shown in FIG. 1, a lead wire 9 that has a connector 9a at an end is connected to the lighting control circuit unit 8. The electric power is supplied to the lighting control circuit unit 8 from the battery (not shown) through the lead wire 9. The case 81 has fixing holes 8d and is fixed to the holder 6 by threading screws 13 into female threaded holes 6c through the fixing holes 8d.

In FIG. 4, a first outline 100 is an outline of the lighting control circuit unit 8 when it is projected in the axial direction of the discharge lamp bulb 4 (left and right direction in FIG. 1). In an assembled state of the headlamp 1, the first outline 100 has a positional relationship with the second outline 200 shown in FIG. 4. Specifically, the first outline 100 is within the second outline 200. Two spaces CC are defined between the first and second outlines 100 and 200. The spaces CC are opposite to each other with respect to a center of the lighting control circuit unit 8. Each of the spaces CC has a width WW equal to or larger than 10 mm. Preferably, the width WW is substantially 15 mm. Therefore, when the lighting control circuit unit 8 is removed to the outside of the lamp housing 2 to exchange the discharge lamp bulb 4, it is possible to insert fingers into the spaces CC and take the lighting control circuit unit 8 out of the lamp housing 2 with fingers. Further, the lighting control circuit unit 8 can be fixed to the holder 6 through the opening portion 2b during the assembly of the headlamp 1.

Here, the lighting control circuit unit 8 is a lighting control circuit including the above-mentioned converter, inverter and igniter, or a circuit including the igniter at least.

The holder 6, which is the holding member for holding the lighting control circuit unit 8 onto the reflector 3, is made of resin or metal. As shown in FIG. 3, the holder 6 has holes 6a at positions corresponding to the fixing surface 3c of the reflector 3. The holder 6 is fixed to the fixing surface 3c of the reflector 3 by threading screws 15 through the holes 6a. Further, a spring 7 is rotatably supported on the holder 6 to press and fix the discharge lamp bulb 4 toward the reflector 3. Also, the holder 6 has hook portions 6b for hooking end portions 7a of the spring 7. The holder 6 has female threaded holes 6c. The lighting control circuit unit 8 is fixed to the holder 6 by threading the screws 13 into the threaded holes 6c through the fixing holes 8d.

The holder 6 is shaped such that the holder 6 can pass through the opening portion 2b when being fixed to the reflector 3 in the lamp housing 2. Although an outline (not shown) of the holder 6 when it is projected in the axial direction of the discharge lamp bulb 4 is partially positioned outside of the second outline 200, the holder 6 is shaped to have capability of passing through the opening portion 2b if it is inclined.

Next, a method of assembling the headlamp 1 of the first embodiment of the present invention is described.

Before this, the reflector 3 is already fixed in the lamp housing 2 and its angle is adjustable with respect to the lamp housing 2. Also, the shade 5 is already attached to the reflector 3. A cover 2c of the lamp housing 2 is removed from the lamp housing 2.

First, the holder 6 is inserted in the lamp housing 2 through the opening portion 2b and fixed to the fixing surface 3c of the reflector 3 by threading screws 15 through the holes 6a. Here, the spring 7 is already fixed to the holder 6 rotatably.

Next, the discharge lamp bulb 4 is inserted in the lamp housing 2 through the opening portion 2b and fixed on the reflector 3. As shown in FIG. 3, the flange 4b of the discharge lamp bulb 4 is inserted in the holding portion 3d of the reflector 3. The recessed portion 4f of the flange 4b is engaged with the projection 3f of the stopper 3e, so that the discharge lamp bulb 4 is properly positioned and the front side surface of the flange 4b is press-contacted with the positioning stopper 3e. Then, the end portions 7a of the spring 7 are hooked on the hook portions 6b while press-contacting the spring 7 toward the flange 4b. In this way, the discharge lamp bulb 4 is press-fitted to the reflector 3.

Then, the lighting control circuit unit 8 is attached to the reflector 3. At this time, the lighting control circuit unit 8 is held with fingers and inserted in the lamp housing 2 through the opening portion 2b. The female connector 8c of the lighting control circuit unit 8 is fitted on the male connector 4c of the discharge lamp bulb 4. The lighting control circuit unit 8 is fixed to the holder 6 by threading screws 13 through the fixing holes 8d and female threaded holes 6c. After an O-ring 10 is attached on the cover 2c, the cover 2c is fitted on the opening portion 2b. Thus, the lamp housing 2 is air-tightly sealed.

Lastly, an optical axis is adjusted to light up a desired direction. Specifically, the reflector 3 is moved in a state that electric power is supplied to the lighting control circuit unit 8 and the discharge lamp bulb 4 is lit up. At this time, because the lighting control circuit unit 8 moves with the reflector 3, the first outline 100 of the lighting control circuit unit 8 is moved against the second outline 200. However, the lighting control circuit unit 8 and the opening portion 2b are shaped such that the moving area of the first outline 100 is always within the second outline 200 during the adjustment of the optical axis in the assembly of the headlamp 1. Further, two spaces CC each having the width WW of substantially 15 mm are defined opposite to each other with respect to the center of the lighting control circuit unit 8 and between the first outline 100 and the second outline 200.

The lighting control circuit unit 8 and the discharge lamp bulb 4 are exchanged in a state that the headlamp 1 is mounted on the vehicle. The lighting control unit 8 and the discharge lamp bulb 4 are exchanged in the following manners.

(1) A method of exchanging the lighting control circuit unit 8.

First, the cover 2c is removed from the opening portion 2b. A screwdriver is inserted in the lamp housing 2 from the opening portion 2b and the screws 13 securing the lighting control circuit unit 8 on the holder 6 are unfastened. Then, fingers are inserted in the spaces CC through the opening portion 2b. The lighting control circuit unit 8 is held with the fingers and removed out through the opening portion 2b.

Next, new lighting control circuit unit 8 is held with fingers and inserted in the lamp housing 2 through the opening portion 2b. The female connector 8c of the lighting control circuit unit 8 is fitted onto the male connector 4c of the discharge lamp bulb 4. Then, the lighting control circuit unit 8 is fixed to the holder 6 by threading the screws 13 through the fixing holes 8d and the female threaded holes 6c. Lastly, the cover 2c is fitted on the opening portion 2b.

In this way, in the headlamp 1, it is unnecessary to remove the lighting control circuit unit 8 with the discharge lamp bulb 4. The lighting control circuit unit 8 is separately removable only by unfastening the screws 13. Therefore, it becomes easy to exchange the lighting control circuit unit 8.

(2) A method of exchanging the discharge lamp bulb 4.

First, the lighting control circuit unit 8 is removed from the lamp housing 2 in a manner similar to the method (1). Then, the end portions 7a of the spring 7 of the holder 6 is unhooked from the hook portions 6b. The discharge lamp bulb 4 is removed and taken out through the opening portion 2b.

Next, new discharge lamp bulb 4 is inserted in the lamp housing 2 through the opening portion 2b. The flange 4b of the discharge lamp bulb 4 is inserted in the holding portion 3d of the reflector 3. The recessed portion 4f of the flange 4b is engaged with the projection 3f of the positioning stopper 3e. The front side surface of the flange 4b is press-contacted to the positioning stopper 3e. Then, the end portions 7a of the spring 7 are hooked on the hook portions 6b of the holder 6 while the spring 7 is urged toward the flange 4b, so the discharge lamp bulb 4 is securely fixed to the reflector 3.

Next, the lighting control circuit unit 8 is attached to the reflector 3 through the holder 6. At this time, the lighting control circuit unit 8 is held with fingers and inserted in the lamp housing 2 through the opening portion 2b. The female connector 8c of the lighting control circuit unit 8 is fitted on the male connector 4c of the discharge lamp bulb 4. Then, the lighting control circuit unit 8 is fixed to the holder 6 by threading the screws 13 into the female threaded holes 6c through the fixing holes 8d. Lastly, the cover 2c is fitted on the opening portion 2b.

In a state that the discharge lamp bulb 4 is lit up by supplying electric power to the lighting control circuit unit 8, the reflector 3 is moved and the optical axis is adjusted at the desired lighting direction, if necessary. In this way, the exchange of the discharge lamp bulb 4 on the vehicle is completed.

In the headlamp 1, when it is viewed along the axial direction of the discharge lamp bulb 4, the first outline 100 of the lighting control circuit unit 8 is within the second outline 200 of the opening portion 2b. Further, the spaces CC are defined between the first outline 100 and the second outline 200 and opposite to each other with respect to the center of the lighting control circuit unit 8. Also, each space CC has the width of substantially 15 mm. Therefore, when the lighting control circuit unit 8 is removed outside of the lamp housing 2 for the exchange of the discharge lamp bulb 4 or the lighting control circuit unit 8, it is possible to insert fingers in the spaces CC and hold the lighting control circuit unit 8 out with fingers. Also, during the assembly of the vehicular headlamp 1, it is possible to attach the lighting control circuit unit 8 onto the holder 6 in the lamp housing 2 through the opening portion 2b.

(Second Embodiment)

Figure 5:
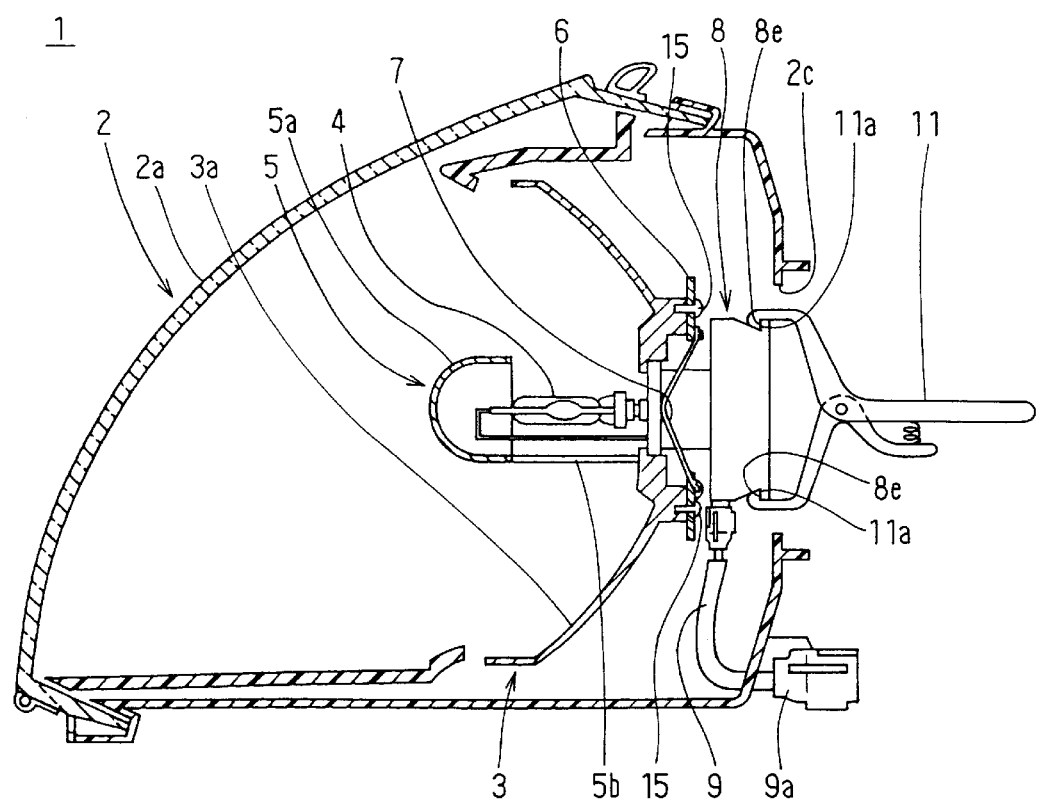
FIG. 5 is a cross-sectional view of a headlamp when a lighting control circuit unit is removed, according to the second embodiment of the present invention.

In the second embodiment, the lighting control circuit unit 8 is not removed by being directly held with the worker's fingers, but removed with a special jig 11, as shown in FIG. 5. The lighting control circuit unit 8 is formed with hook portions 8e. Hook portions 11a of the jig 11 are hooked on the hook portions 8e. Therefore, it becomes easy to remove the lighting control circuit unit 8 even when it is difficult to directly hold the lighting control circuit unit 8 with fingers under a limited working space in the vehicle, during the exchange.

(Third Embodiment)

Figure 6:
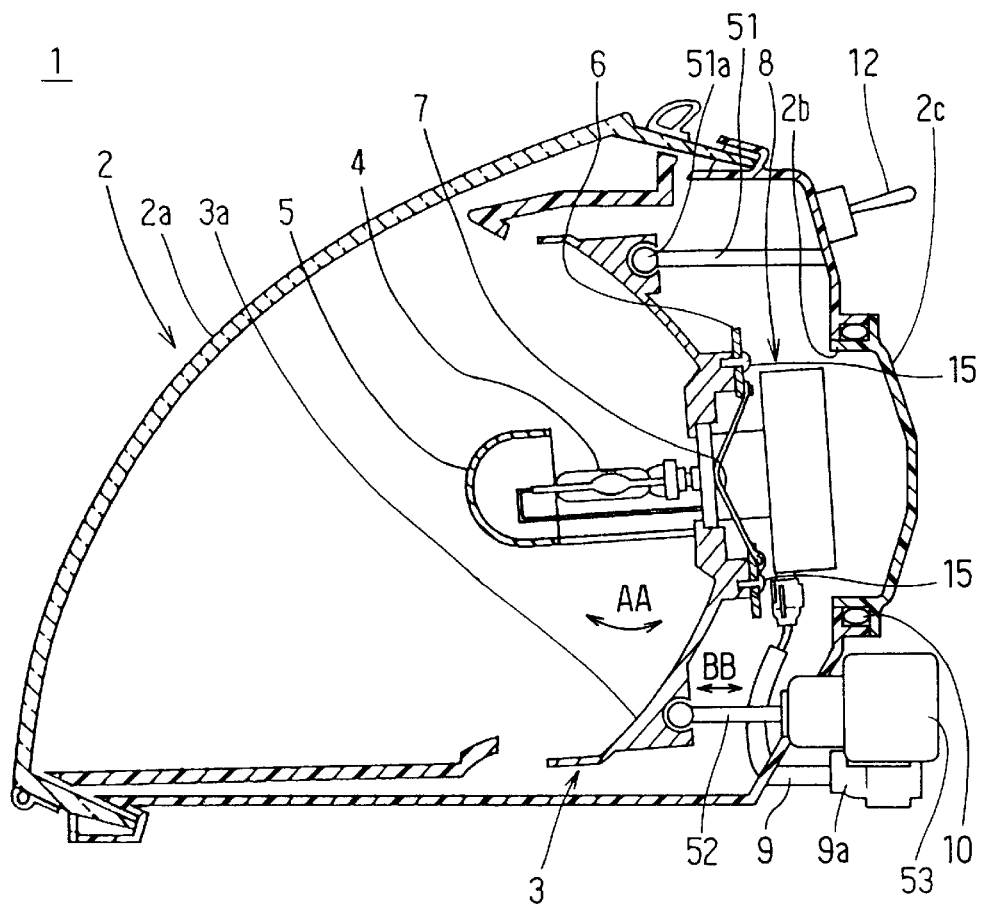
FIG. 6 is a cross-sectional view of a headlamp according to the third embodiment of the present invention.

In the third embodiment, the headlamp 1 has a leveling mechanism, as shown in FIG. 6. The leveling mechanism maintains the optical axis of the headlamp 1 at the predetermined direction by moving the reflector 3 with an actuator, especially when a vehicle posture is changed due to change of a passenger arrangement or loading condition on the vehicle.

The leveling mechanism includes a support portion 51, a movable portion 52, a step motor 53 as an actuator and the like. The support portion 51 is substantially a rod shape and supports the reflector 3 such that the reflector 3 has capability of moving or rotating in a direction of an arc arrow AA in FIG. 6. The movable portion 52 is substantially a rod shape and supports the reflector 3. The movable portion 52 is moved in a direction of an arrow BB in FIG. 6 when the step motor 53 is actuated. With the movement of the movable portion 52, the reflector 3 is moved or rotated in the direction of the arrow AA about an end portion 51a of the support portion 51 as a fulcrum, and the optical axis of the headlamp 1 is adjusted.

An operation of the leveling mechanism is briefly described.

In a vehicle (not shown) in which the optical axis of the vehicular headlamp 1 is adjusted in the predetermined direction, if loads are carried on the rear portion of the vehicle, the rear portion of the vehicle falls and the optical axis changes upward. At this time, the step motor 53 is actuated and the movable portion 52 is moved in the right side in FIG. 6, so the reflector 3 is moved in a counterclockwise direction about the fulcrum 51a in FIG. 6. Therefore, the optical axis of the vehicular headlamp 1 is moved downward and adjusted in the predetermined direction. Accordingly, it is reduced that a bright light beam hits on an oncoming vehicle and the like.

In this state, when the loads are removed from the vehicle, the rear portion of the vehicle rises and the vehicle is returned to an original posture. The optical axis is changed downward. At this time, the step motor 53 is actuated. The movable portion 52 is moved in the left side in FIG. 6 and the reflector 3 is moved in a clockwise direction in FIG. 6 about the fulcrum 51a, so that the reflector 3 is returned to an original state before the loads are carried. Therefore, the optical axis of the vehicular headlamp 1 is moved upward and adjusted in the predetermined direction. Accordingly, visibility in a distance is maintained.

Here, change of the vehicle posture is determined by determining relative change amounts between a front axle shaft and a body and between a rear axle shaft and the body.

Further, a switch 12 is provided on the lamp housing 2 at a position where it can be easily operated during the exchange of the discharge lamp bulb 4. For example, the switch 12 is positioned on a rear surface of the lamp housing 2, as shown in FIG. 6. With the operation of the switch 12, the step motor 53 is operated independently from the control of the leveling mechanism.

Figure 7:
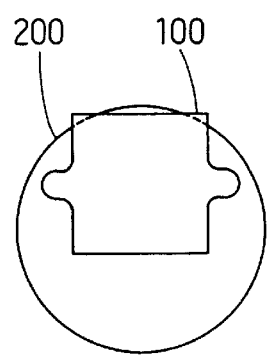
FIG. 7 is a schematic illustration showing a positional relationship between a first outline of a lighting control circuit unit and a second outline of an opening portion of a lamp housing, according to the third embodiment of the present invention.

Normally, the range of a rotation angle of the reflector 3 by the leveling mechanism is greater than the range of the rotation angle of the reflector 3 while adjusting the optical axis during the assembly of the vehicular headlamp 1. Therefore, the positional change amount of the lighting control circuit unit 8 in leveling with respect to the opening portion 2b is large. Therefore, before the exchange of the discharge lamp bulb 4 or the lighting control circuit unit 8, the opening portion 2b and the lighting control circuit unit 8 are likely to have the positional relationship shown in FIG. 7. For example, the first outline 100 is likely to be partially positioned outside of the second outline 200. In this case, it is difficult to remove the lighting control circuit unit 8 through the opening portion 2b.

In such a case, the reflector 3 can be moved with the operation of the switch 12. With this, the lighting control circuit unit 8 can be moved to the position where the lighting control circuit unit 8 can be removed through the opening portion 2b by pulling backwards, which is the position shown in FIG. 4. Accordingly, similar to the first embodiment, the lighting control circuit unit 8 can be easily removed.

Even in the case that the discharge lamp bulb 4 or the lighting circuit portion 8 is exchanged after the operation of the switch 12, the leveling mechanism is operated right after an ignition switch (not shown) of the vehicle is turned on. Therefore, the optical axis can be automatically adjusted in the predetermined direction by the leveling mechanism.

Here, the step motor 53 is used as the actuator for rotating the reflector 3. However, other actuators such as a d.c. motor, a linear solenoid and the like can be used.

Further, in the third embodiment, the optical axis is adjusted in the top and bottom direction by the leveling mechanism. In addition to this, the optical axis can be adjusted in a left and right direction of the vehicle by adding another actuator.

(Fourth Embodiment)

Figure 8:
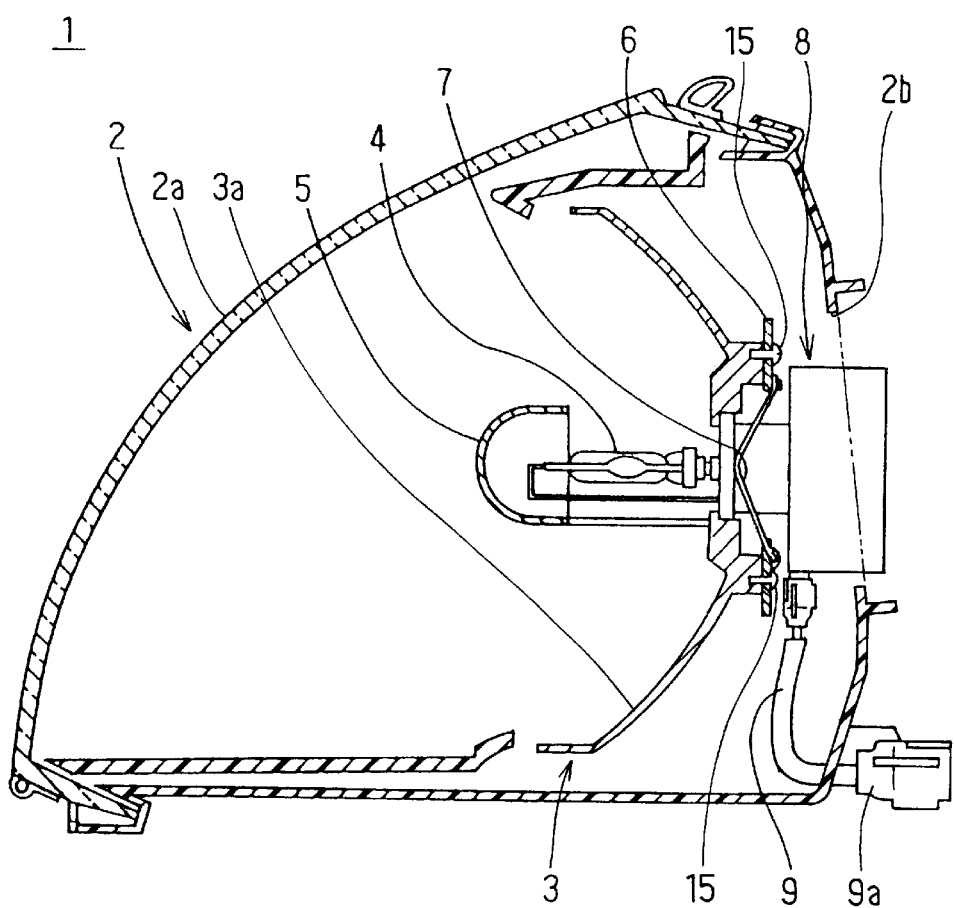
FIG. 8 is a cross-sectional view of a headlamp according to the fourth embodiment of the present invention.

In the fourth embodiment, as shown in FIG. 8, a shape of the lamp housing 2 is changed from that in the first embodiment. In FIG. 8, the cover 2c is removed. The lighting control circuit unit 8 is partially protruded from the opening portion 2b to the right side in FIG. 8. Therefore, the lighting control circuit unit 8 is easily removed outside of the lamp housing 2 by holding the protruded portion of the lighting control circuit unit 8.

(Fifth Embodiment)

Figure 9:
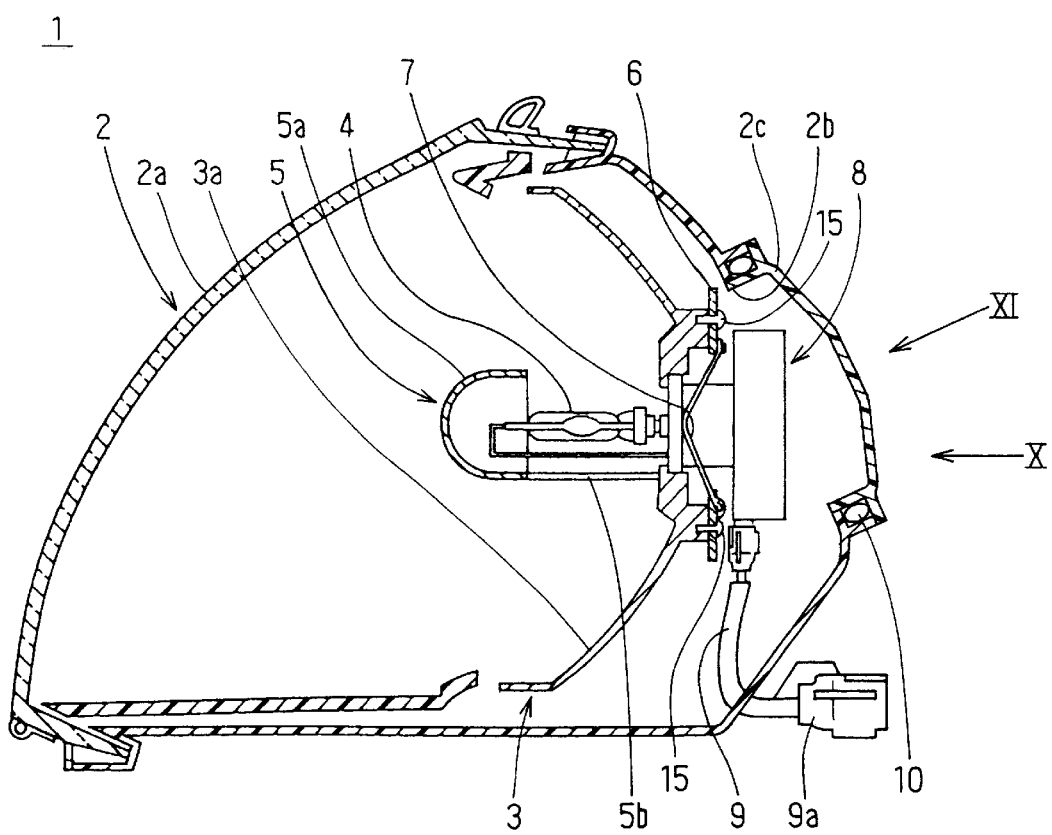
FIG. 9 is a cross-sectional view of a headlamp according to the fifth embodiment.
Figure 10:
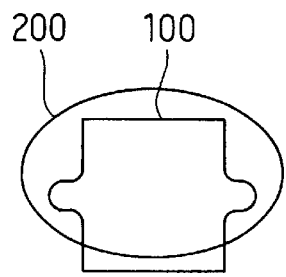
FIG. 10 is a schematic illustration showing a positional relationship between a first outline of a lighting circuit portion and a second outline of an opening portion of a lamp hosing when a headlamp is viewed along an arrow X in FIG. 9, according to the fifth embodiment.
Figure 11:
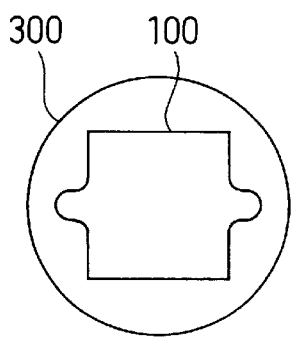
FIG. 11 is a schematic illustration showing a positional relationship between the first outline of the lighting circuit portion and a third outline of the opening portion of the lamp housing when the headlamp is viewed along an arrow XI in FIG. 9, according to the fifth embodiment.

In the fifth embodiment, the shape of the lamp housing 2 is changed from that of the first embodiment, as shown in FIG. 9. In FIG. 10, the first outline 100 is the outline of the lighting control circuit unit 8 when it is projected in the axial direction of the discharge lamp bulb 4 (a direction of an arrow X in FIG. 9). The second outline 200 is the outline of the opening portion 2b when it is projected in the axial direction of the discharge lamp bulb 4. The first outline 100 and second outline 200 have the positional relationship shown in FIG. 10. That is, the first outline 100 is partially positioned outside of the second outline 200. Therefore, it is difficult to remove the lighting control circuit unit 8 thorough the opening portion 2b only by pulling in the axial direction of the discharge lamp bulb 4. Here, when the opening portion 2b is projected along a direction of an arrow XI in FIG. 9, an outline 300 of the opening portion 2b has a maximum projected area. As shown in FIG. 11, the outline 100 of the lighting control circuit unit 100 is within the outline 300. In this case, the lighting control circuit unit 8 is removed outside of the lamp housing 2 in such a manner that the lighting control circuit unit 8 is separated from the discharge lamp bulb 4 by being moved in the axial direction of the discharge lamp bulb 4 and its posture is changed to pass through the opening portion 2b.

In the first to the fifth embodiments, although the lighting control circuit unit 8 is formed as a single part, it can be separated into a plurality of parts. For example, the lighting control circuit unit 8 can be separated into the igniter, and a unit including the converter and inverter. The igniter is fixed to the reflector 3. The unit including the converter and inverter is fixed at the predetermined portion in the lamp housing 2. The igniter is connected to the unit including the converter and inverter with a wire.

Although the first outline 100 of the lighting control circuit unit 8 has substantially a rectangular shape and the second outline 200 of the opening portion 2b has substantially a circular shape, it is not limited to those shapes, but may have other shapes.

Figure 12:
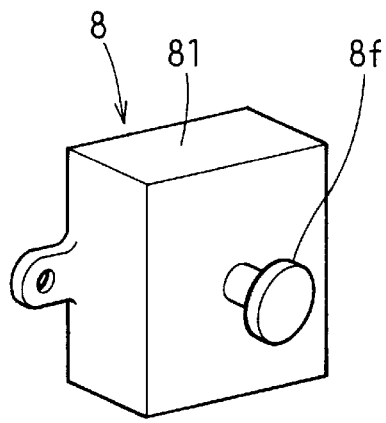
FIG. 12 is a perspective view of a lighting control circuit unit of a modified embodiment.
Figure 13:
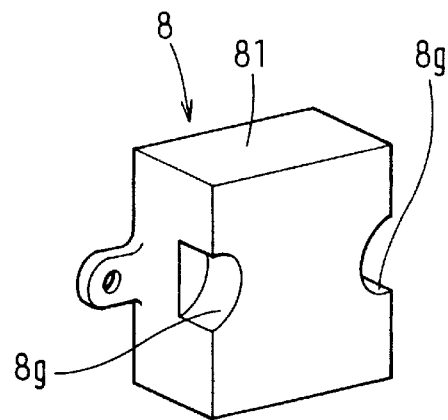
FIG. 13 is a perspective view of a lighting control circuit unit of another modified embodiment.

As shown in FIG. 12, a knob 8f can be provided on the lighting control circuit unit 8 to be held with fingers. With this, it becomes easy to handle the lighting control circuit unit 8 during the assembly or the exchange. Further, as shown in FIG. 13, the lighting control circuit unit 8 can have recessed portions 8g to be held with fingers. Also in this case, it becomes easy to remove the lighting control circuit unit 8 with fingers during the exchange of the discharge lamp bulb 4.

Although the lighting control circuit unit 8 is fixed to the holder 6 with screws 13, the lighting control circuit unit 8 can be fixed to the holder 6 by another means. For example, the holders 6 and the case 81 are formed with hook portions to engage with each other. Thus, the lighting control circuit unit 8 is removable from the holder 6 by unhooking the hook portions. Also in this case, the lighting control circuit portion 8 and the discharge lamp bulb 4 can be separately and easily exchanged.

The present invention should not be limited to the disclosed embodiments, but may be implemented in other ways without departing from the spirit of the invention.

What is claimed is:

1. A headlamp for a vehicle comprising:
    a discharge lamp bulb;
    a reflector for reflecting light emitted from the discharge lamp bulb in a predetermined direction, the reflector holding the discharge lamp bulb and;
    a lighting control circuit unit for driving the discharge lamp bulb, the lighting control circuit unit being directly connected to the discharge lamp bulb;
    a lamp housing enclosing the discharge lamp bulb, the reflector and the lighting control circuit unit and having an opening; and
    a cover fitted on the opening of the lamp housing for air-tightly sealing the lamp housing,
    wherein the lighting control circuit unit is removable through the opening in a state that the discharge lamp bulb is held on the reflector.

2. The headlamp according to claim 1, wherein the discharge lamp bulb is exchangeable through the opening.

3. The headlamp according to claim 1, further comprising a holder for holding the lighting control circuit unit, wherein the holder is fixed to the reflector with a first means and the lighting control circuit unit is fixed to the holder with a second means.

4. The headlamp according to claim 3, wherein the lighting control circuit unit is removable by unfastening the second means.

5. The headlamp according to claim 3, wherein the discharge lamp bulb has a light emitting portion and a flange, and the holder has a spring to securely fix the flange to the reflector.

6. The headlamp according to claim 1, wherein the opening of the lamp housing is located adjacent to the lighting control circuit unit, and when the opening and the lighting control circuit unit are viewed in an axial direction of the discharge lamp bulb, a first outline that is an outline of the lighting control circuit unit is positioned within a second outline that is an outline of the opening.

7. The headlamp according to claim 6, wherein at least two spaces each having a width greater than 10 mm are defined between the first outline and second outline and the spaces are opposite to each other with respect to a center of the lighting control circuit unit.

8. The headlamp according to claim 1, wherein the lighting control circuit unit is removable with a jig.

9. The headlamp according to claim 1, further comprising an actuator for moving the reflector, wherein the lighting control circuit unit is movable with the reflector to a position where the lighting control circuit unit is removable through the opening.

10. The headlamp according to claim 1, wherein the lighting control circuit unit partially protrudes from the opening.

11. The headlamp according to claim 1, wherein the lighting control circuit unit includes an igniter at least.

* * * * *